Figure 1:
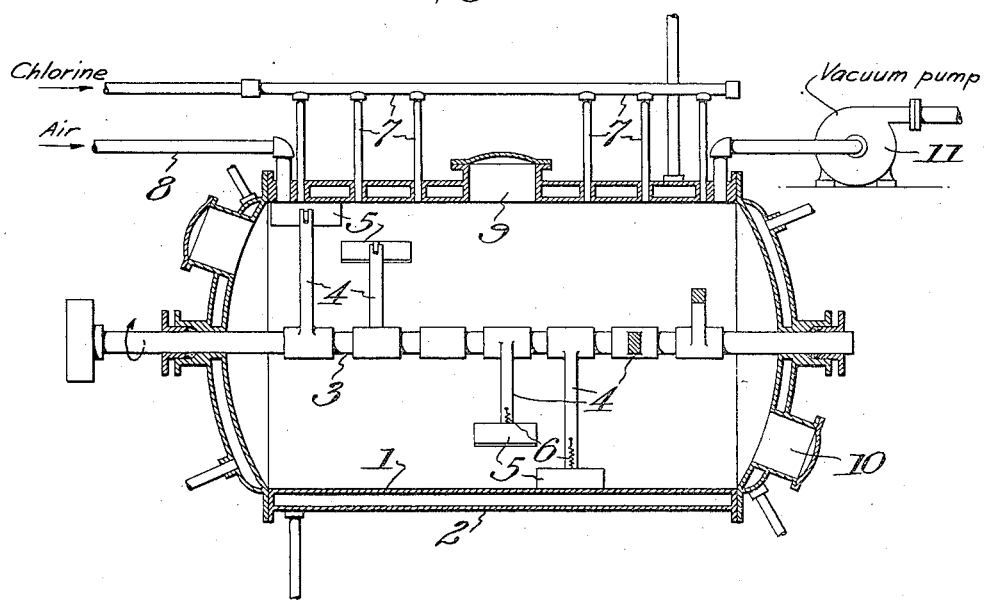

March 3, 1936. E. RENSCHLER ET AL 2,032,632

PROCESS AND APPARATUS FOR THE MANUFACTURE OF BLEACHING POWDER

Filed Nov. 2, 1932

Inventors:
Eugen Renschler and
Adolf Remele
By Byrnes Townsend & Potter
their Attorneys.

Patented Mar. 3, 1936

2,032,632

UNITED STATES PATENT OFFICE 2,032,632

PROCESS AND APPARATUS FOR THE MANUFACTURE OF BLEACHING POWDER

Eugen Renschler, Rheinfelden, and Adolf Remelé, Sandersdorf, Germany, assignors to I. G. Farbenindustrie Aktiengesellschaft, Frankfort-on-the-Main, Germany Application November 2, 1932, Serial No. 640,884
In Germany November 2, 1931

7 Claims. (Cl. 23—86)

The present invention relates to a process and apparatus for the manufacture of bleaching powder, and more particularly of bleaching powder poor in, or entirely free of, moisture (including water of crystallization) by a continuous process and in a mechanical appliance by reacting chlorine gas with hydrate of lime.

In the course of reaction between chlorine gas and hydrate of lime there is regularly attained a stage in which the product of reaction begins to lose its pulverulent dust-like appearance and undergoes a progressive alteration in which it at first becomes similar to moistened hydrate of lime. This alteration in appearance is independent of the chlorine gas concentration applied, taking place sooner or later in the course of the process when the content of avilable chlorine has risen up to between about 25 and 34 percent and being largely dependent on the general conditions of working. When chlorination is carried beyond this point the reaction product becomes still moister until it finally assumes a sticky condition and forms lumps and balls which on cooling solidify into hard masses. Bleaching powder when thus obtained in the normal manner contains a large percentage of lumps of various size and is for this and other reasons inferior in quality. The appearance of this phenomenon which in the following will be referred to as the "moisture point", is apparently connected with a change in constitution of the bleaching powder brought about by the liberation, by the action of chlorine, of the water combined with CaO in the hydrate of lime; it causes disturbances in the uniform progress of chlorination and difficulties in the dehydration of the product and renders the stirring of the reaction mass by mechanical means, which is otherwise desirable, difficult if not impossible.

On the other hand, it is well known that a moderate free water content of the hydrate of lime is advantageous in all stages of chlorination, and that chlorination is liable to come to an entire standstill when the water set free in the reaction is prematurely removed.

In view of these considerations a number of more recent processes for improving the manufacture of bleaching powder have followed the aim of retarding the appearance of the moisture point, or even suppressing it entirely so as to obviate the unwelcome effects with which it is attended. Thus it has been suggested to eliminate local overheating by the action of chlorine on hydrate of lime—which was supposed to be the principal reason for the moisture point—by strongly diluting the chlorine gas while working continuously, and at the same time to remove varying quantities of water of reaction during chlorination by correspondingly increasing the vapour tension of that water which may then be progressively led away from the zone of reaction by the current of diluting air. It has further been proposed to carry out chlorination of hydrate of lime in a continuous process by passing highly diluted chlorine gas through a rotary tube in counter-current to hydrate of lime. The leading idea of this manner of working was to evaporate the reaction water by the heat of reaction and thus to obtain an entirely dehydrated bleaching powder. In carrying out the latter process it has transpired however that the dehydration of the reaction product caused by the gas current sooner or later proceeds so far that the capacity of the reaction mass for combining with chlorine gas is strongly impaired, and that at the same time the large quantities of diluting air, owing to the necessary high speed of circulation, carry away great amounts of dust consisting of partially decomposed bleaching powder which owing to the continuous removal of the reaction water remains in a pulverulent condition during the whole chlorination. On the other hand, when attempting to reduce the quantity of diluting air in order to preserve a definite water content in the reaction mass as is necessary for a steady and uniform chlorination, and in order to prevent the formation of dust, or if the reaction mass during chlorination is artificially moistened, for instance by spraying with water, the moisture point and its adverse effects again become rapidly observable.

It has now been recognized as a fundamental defect of the afore-mentioned continuous processes that every one of the individual stages through which the hydrate of lime passes during chlorination and dehydration is once and for all definitely determined over the entire course of reaction by the starting conditions (water content of the hydrate of lime supplied, and temperature, concentration and total volume of the reaction gases). It follows that, it is impossible in a continuous process to maintain the water content of the reaction mass, for every individual stage of chlorination, at will within the definite range required for carrying out chlorination, which range is limited on one part by the necessity of obviating the moisture point, and on the other part by the necessity of preserving the capacity of the reaction mass for combining with chlorine. Only by maintaining the water content of the reaction mass during the entire progress of chlorination within the afore-said limits would it appear possible to guarantee the proper progress of chlorination and the recovery of a dehydrated uniform product as well as to eliminate the drawbacks inherent in the prior proposals, and this control of the pressure and temperature conditions in a manner predetermined and arbitrary with regard to every individual stage of chlorination is only possible in a discontinuous process.

Another point in favour of the discontinuous process in which the reaction mass as a total passes successively through the individual phases of the reaction is that it is possible to promote the establishment of uniform conditions in all parts of the reaction mass by mechanical revolution. In a continuous process, however, the mechanical revolution of the reaction mass acts as a disturbing factor to the predetermined progress of the chlorinating process, inasmuch as in that case portions of the reaction mass having each attained different stages of chlorination are closely adjacent within the reaction vessel and are bound to become intermingled by mechanical revolution. For the same reason it is difficult, or even impossible in a continuous process to control or modify the reaction in a predetermined manner from without, such as by cooling, heating or the like.

In accordance with the foregoing considerations the present invention contemplates the manufacture of bleaching powder by treating hydrate of lime with chlorine gas in a discontinuous process, the conditions prevailing in the different stages of which are controlled in a predetermined manner. In the first stage, hydrate of lime is contacted with chlorine gas in such a manner that the water of reaction formed is not removed to any substantial extent up to a point, in which a moderate content of available chlorine is reached, but before the moisture point is attained. In the following stage, in which chlorination is continued, the reaction water is continuously removed so as to maintain the pulverulent or granular condition of the reaction mass, but not to an extent impairing the capacity of the latter for combining with chlorine in any way. In the final stage of the process, chlorination is discontinued and the remaining water of reaction may be removed by a drying process.

The maintenance of the prescribed temperature and pressure conditions in the first stage of the process can be achieved in any suitable manner so long as the fact is taken into consideration that the removal of the reaction water depends on the water vapour tension actually prevailing in the atmosphere overlying the reaction mass, the water vapour tension itself being largely governed by the actual temperature. It is thus advantageous to apply external cooling in the first stage of the process in order to prevent the temperature from rising beyond about 40° C. in any part of the reaction mass during chlorination.

The progressive removal of the reaction water in the second stage of the process is, without interrupting chlorination, brought about by a corresponding alteration in the physical conditions of the mass, that is to say, by increasing the temperature (if necessary by supplying external heat) or by applying reduced pressure, or both combined. When working under normal pressure, the temperature is slowly raised to about 40 to 45° C. by external heating. In cases in which strongly diluted chlorine is employed in the reaction the diluting gas (air) will take up the water vapours evolved and lead them away. If, however, concentrated chlorine gas is used, it is necessary to pass a special current of inert gas (air) through the reaction vessel during this stage of the process for this purpose (aeration). It is advantageous to facilitate the rise in temperature in this stage by preheating the gaseous mixture entering the reaction chamber (or only the special supply of air, as the case may be) up to about 35° C. In any case, however, it is necessary to see that the total absorption of the chlorine gas supplied by the reaction mass is not impaired by too strongly diluting the former.

When the supply of chlorine with simultaneous aeration has led to about 30 to 33 per cent of available chlorine in the reaction mass, dehydration has progressed so far that only a few percent of water remain in the mass. At this point, the air supply is shut off and chlorination is carried on until the desired chlorine content (generally 36 percent and over) is attained, whereupon it is possible to free the product from the remaining water in any suitable manner either partially or entirely, as desired, without any danger of the moisture point and the difficulties connected therewith becoming apparent.

In cases in which it is desirable to effect removal of the reaction water in the second stage of the process by means of reduced pressure instead of aeration, it is merely necessary to connect the chlorinating apparatus with a vacuum pump drawing off the water vapours which are evolved in that stage owing to the rise in temperature. Moreover it has proved advantageous to continuously remove moderate quantities of reaction water even in the first stage of chlorination by the application of reduced pressure; but in that case one must be particularly careful to prevent an excessive removal of reaction water which would unduly diminish the capacity of the reaction mass for combining with chlorine, by maintaining a temperature somewhat below the upper limit of about 40° C.

A very important feature in carrying out the present invention is a thorough mechanical revolution of the reaction mass during the entire course of chlorination so as to ensure a uniform reaction of the chlorine upon all parts of the mass; and it is moreover advantageous to maintain the solids in a state of fine subdivision or, as it were, in a state of suspension in the reaction atmosphere by energetic stirring.

Experience has shown that when working with normal pressure in the first stage of chlorination a moderate agglomeration of the particles of partially chlorinated hydrate of lime takes place by virtue of a kind of sintering process which is furthermore promoted by the mechanical revolution of the reaction mass; this phenomenon being probably somewhat related to the appearance of the moisture point, without however attaining a degree in which the visible moisture point and its undesirable effects would be apparent. This mode of working therefore leads to a somewhat increased relative consistency, and also to a more finely granular,—as distinguished from a pulverulent—appearance of the finished product. In contradistinction, when working with reduced pressure a highly pulverulent bleaching powder of low relative consistency is obtained. By suitably modifying the process according to the present invention in a predetermined manner it is thus possible to obtain different grades of the final product and thus to comply with special wishes of the customers which are frequently widely different with regard to the desired relative consistency of bleaching powder, without otherwise modifying its quality.

The following examples are representative of various modes of carrying out the present invention without limiting it thereto.

The accompanying drawing illustrates one form of apparatus for carrying out the process.

In the drawing, Fig. 1 is a longitudinal section of the apparatus, and

Figure 2:
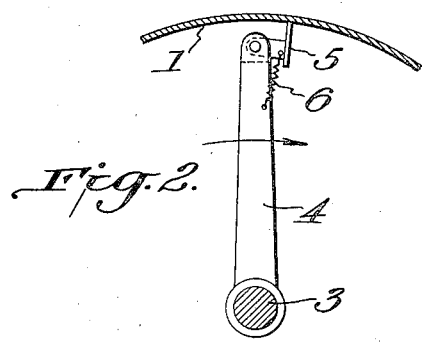

Fig. 2 is a detail of one of the stirrer arms.

EXAMPLE 1

*Showing the manner of working at atmospheric pressure and with aeration in the second (dehydration) stage*

The process is carried out in a horizontally positioned closed cylinder 1 of 2 ms. length and 1.20 ms. diameter provided with a water-jacket 2 for cooling and heating and with a mechanically driven stirring mechanism consisting of a shaft 3 axially journalled in an air-tight manner in the cylinder and bearing shovels 4 arranged in spike-form and adapted to effect a thorough revolution of the reaction mass during chlorination. The outer ends of the shovels are provided with scrapers 5 which are pressed against the cylinder walls by means of springs 6 and are thus adapted, on rotation, to remove incrustations the moment they begin to form on the walls of the cylinder. The vessel is further provided with means 7 for supplying concentrated chlorine gas at various points, means 8 for passing a current of air through the device, and means 9 and 10 for charging hydrate of lime and discharging the finished bleaching powder, respectively.

In the described reaction vessel, 500 kgs. of hydrate of lime are treated with concentrated chlorine gas (96 to 98 percent $Cl_2$) while cooling from without in such a manner that a temperature somewhat below 40° C. is maintained, until after about 6 hours of chlorination the reaction mass contains about 23 percent of available chlorine. Subsequently, the cylinder is heated up to about 45° C. while still supplying chlorine gas and simultaneously passing a current of air heated to about 35° C. through the apparatus. The quantity of air is so adjusted that for every 6 units of volume of chlorine between about 80 and 100 units of volume of air are introduced. After about 4 hours the air supply is shut off, whereas chlorination is continued for another 2 hours while keeping the reaction vessel closed until the available chlorine content of the product has risen to about 36 percent. If it is desired to remove the small percentage of water (2 to 4 percent) still remaining in the finished bleaching powder, the reaction mass is then again aerated while heating to between 45 to 55° C. (the chlorine supply of course being shut off), until dehydration is completed.

EXAMPLE 2

*Showing the manner of working at normal pressure in the first, and reduced pressure in the second (dehydration) stage*

The apparatus for carrying out the process is somewhat similar to that employed in Example 1, the inlets for the chlorine supply being however distributed over the upper side of the cylinder walls and a special vacuum pump 11 being connected with the cylinder itself.

In this device, hydrate of lime is treated with concentrated chlorine gas (96 to 98 percent) at first at ordinary pressure while simultaneously maintaining a temperature of about 30° C. by cooling from without until after about 7 or 8 hours the available chlorine content has risen up to 31 to 32 percent. Although the water content of the intermediary product at the end of this period amounts to about 8 percent, there is as yet no indication of the moisture point. Thereupon the pressure is reduced to about 30 to 40 mms. mercury absolute, while continuing the chlorine gas supply, and the temperature of the reaction mass is slowly raised to about 50 to 55° C. by external heating. After treatment in this manner the product contains 36 to 37 percent of available chlorine and the water content has been reduced to 2 to 3 percent. When this condition is attained, the chlorine gas supply is shut off and the product is then maintained under the prevailing pressure and temperature conditions until it is completely dehydrated. The anhydrous final product contains 37.5 percent of available chlorine and about 1 percent of chloride-chlorine and represents a finely pulverulent, uniform, stable bleaching powder having a pure white appearance and a hardly perceptible odour.

EXAMPLE 3

*Showing the manner of working with reduced pressure during the whole course of chlorination*

In an apparatus similar to that employed in Example 2, hydrate of lime is exposed to the action of concentrated chlorine gas under pressure conditions starting with about 44 mms. mercury absolute and slowly rising to 90 mms. mercury absolute, while cooling at first down to 20° C., the temperature being gradually allowed to rise up to 35° C. After 5 hours of chlorination the intermediary product contains about 29 percent of available chlorine and about 4 percent of water and is in a fluffy easily workable condition. When this stage has been reached the temperature is progressively increased from 40° C. to 55° C., a pressure of about 30 to 50 mms. mercury absolute being maintained while continuously introducing fresh chlorine gas. After a lapse of further 4 hours the product contains about 37 percent of available chlorine and about 2.5 percent of water. Chlorination is then discontinued and the product entirely dehydrated by maintaining the pressure and temperature conditions prevailing at the end of the former stage. The finished bleaching powder contains about 36.5 percent of available chlorine, about 1.5 percent of chloride-chlorine and 0.9 percent of water and has a pure white appearance, a slight odour, and is finely pulverulent.

Owing to the practically complete suppression of the moisture point, the process according to the invention yields a uniform extremely stable pulverulent or finely granular bleaching powder which is poor in, or even entirely free of, water and contains only a very small percentage of chloride-chlorine. It is a particular advantage of the present process that it can be carried out in iron reaction vessels owing to the practically complete obviation of incrustations which otherwise would give rise to rapid corrosion of the iron vessels. A further advantage of the process when carried out with aeration, (an advantage which is particularly apparent in comparison with any continuous process) resides in that it is possible to adapt the chlorine concentration during the first dehydration stage to the capacity of the intermediary product for combining with chlorine. This may be achieved by passing a comparatively strong current of air through the reaction vessel during the first part of that stage in which the capacity of the reaction mass for combining with chlorine is still large, while the current of air is strongly diminished or even entirely shut off towards the end of chlorination, thus bringing highly concentrated chlorine gas into reaction with the intermediary product at a time when, owing to the high content of available chlorine in the product in the meantime attained, the reaction with chlorine would otherwise be but sluggish. In this manner it is possible to ensure a practically total absorption of the chlorine gas supply by the reaction mass during the whole process, thus eliminating the necessity for circulating the chlorine and condensing the water vapour taken up by the effluent gases as well as dispensing with the costly and but moderately reliable apparatus otherwise required for this purpose. In contradistinction, the known continuous processes, in which the proportion between chlorine and air is once and for all determined by the proportion prevailing in the gaseous mixture introduced into the reaction chamber for every single one of the successive reaction zones, renders the complete absorption of chlorine impossible unless one is prepared to abandon the idea of complete chlorination of the reaction mass, and it was therefore necessary always to provide in such prior processes special circulating apparatus for the chlorine gas and apparatus for condensing the water vapour.

It is to be understood that in the present specification the term "continuous process" comprises every process for making bleaching powder by interaction of hydrate of lime and chlorine gas in which hydrate of lime is either continuously or successively in small portions fed into one end of the reaction chamber and the finished bleaching powder is continuously or intermittently withdrawn from the other end of the reaction chamber which thus simultaneously contains portions of hydrate of lime in different stages of chlorination; whereas the term "discontinuous process" means a process based on the same chemical reaction, in which batches of hydrate of lime are, as a whole, treated with chlorine gas in a reaction chamber under uniform conditions with respect to all parts of the charge until the whole charge is converted into bleaching powder.

We claim:—

1. In a discontinuous process of making bleaching powder by interaction of hydrate of lime and chlorine gas by first chlorinating hydrate of lime until a moderate content of available chlorine is attained while the reaction mass is still in a condition ranging from pulverulent to finely granular, and then continuing the chlorine supply while at the same time gradually removing reaction water in a measure sufficient to maintain such pulverulent or finely granular condition in the reaction mass, but insufficient to substantially reduce the capacity of the mass for combining with chlorine, the step which consists in removing the reaction water in the second stage of the process by the application of subatmospheric pressure while simultaneously heating the reaction mass.

2. In a discontinuous process of making bleaching powder by interaction of hydrate of lime and chlorine gas by first chlorinating hydrate of lime until a moderate content of available chlorine is attained while the reaction mass is still in a condition ranging from pulverulent to finely granular, and then continuing the chlorine supply while at the same time gradually removing reaction water in a measure sufficient to maintain such pulverulent or finely granular condition in the reaction mass, but insufficient to substantially reduce the capacity of the mass for combining with chlorine, the step which consists in maintaining temperatures moderately below about 40° C. in the first stage of the process, and raising the temperature in the second stage of the process to at least about 45° C. while introducing a current of inert gas into the reaction chamber.

3. In a discontinuous process of making bleaching powder by interaction of hydrate of lime and chlorine gas by first chlorinating hydrate of lime until a moderate content of available chlorine is attained while the reaction mass is still in a condition ranging from pulverulent to finely granular, and then continuing the chlorine supply while at the same time gradually removing reaction water in a measure sufficient to maintain such pulverulent or finely granular condition in the reaction mass, but insufficient to substantially reduce the capacity of the mass for combining with chlorine, the step which consists in maintaining a temperature between about 25° C. and about 35° C. in the first stage of the process and raising the temperature in the second stage of the process to just above 45° C. while introducing a current of air preheated to about 35° C. into the reaction chamber.

4. In a discontinuous process of making bleaching powder by interaction of hydrate of lime and chlorine gas by first chlorinating hydrate of lime until a moderate content of available chlorine is attained while the reaction mass is still in a condition ranging from pulverulent to finely granular, and then continuing the chlorine supply while at the same time gradually removing reaction water in a measure sufficient to maintain such pulverulent or finely granular condition in the reaction mass, but insufficient to substantially reduce the capacity of the mass for combining with chlorine, the step which consists in maintaining temperatures moderately below about 40° C. in the first stage of the process and raising the temperature to between about 50° C. and about 55° C. in the second stage of the process while substantially maintaining subatmospheric pressure in the reaction chamber.

5. In a discontinuous process of making bleaching powder by interaction of hydrate of lime and chlorine gas by first chlorinating hydrate of lime until a moderate content of available chlorine is attained while the reaction mass is still in a condition ranging from pulverulent to finely granular, and then continuing the chlorine supply while at the same time gradually removing reaction water in a measure sufficient to maintain such pulverulent or finely granular condition in the reaction mass, but insufficient to substantially reduce the capacity of the mass for combining with chlorine, the step which consists in maintaining a temperature of about 25° C. in the first stage of the process, and raising the temperature to between about 50° C. and about 55° C. in the second stage of the process while substantially maintaining subatmospheric pressure in the reaction chamber.

6. In a discontinuous process of making bleaching powder by interaction of hydrate of lime and chlorine gas by first chlorinating hydrate of lime until a moderate content of available chlorine is attained while the reaction mass is still in a condition ranging from pulverulent to finely granular, and then continuing the chlorine supply while at the same time gradually removing reaction water in a measure sufficient to maintain such pulverulent or finely granular condition in the reaction mass, but insufficient to substantially reduce the capacity of the mass for combining with chlorine, the step which consists in maintaining temperatures moderately below about 40° C. in the first stage of the process and raising the temperature gradually to between about 50° C. and about 55° C. in the second stage of the process while maintaining substantially subatmospheric pressure in the reaction chamber during the whole process of chlorination.

7. In a discontinuous process of making bleaching powder by interaction of hydrate of lime and chlorine gas by first chlorinating hydrate of lime until a moderate content of available chlorine is attained while the reaction mass is still in a condition ranging from pulverulent to finely granular, and then continuing the chlorine supply while at the same time gradually removing reaction water in a measure sufficient to maintain such pulverulent or finely granular condition in the reaction mass, but insufficient to substantially reduce the capacity of the mass for combining with chlorine, the step which consists in maintaining a temperature of between about 20° C. and about 25° C. in the first stage of the process and raising the temperature gradually to between about 50° C. and about 55° C. in the second stage of the process while maintaining a pressure of between about 40 and about 90 mms. mercury absolute in the reaction chamber during the whole process of chlorination.

EUGEN RENSCHLER.
ADOLF REMELÉ.